(Model.)
F. S. STARK.
BROOM.
No. 394,410. Patented Dec. 11, 1888.
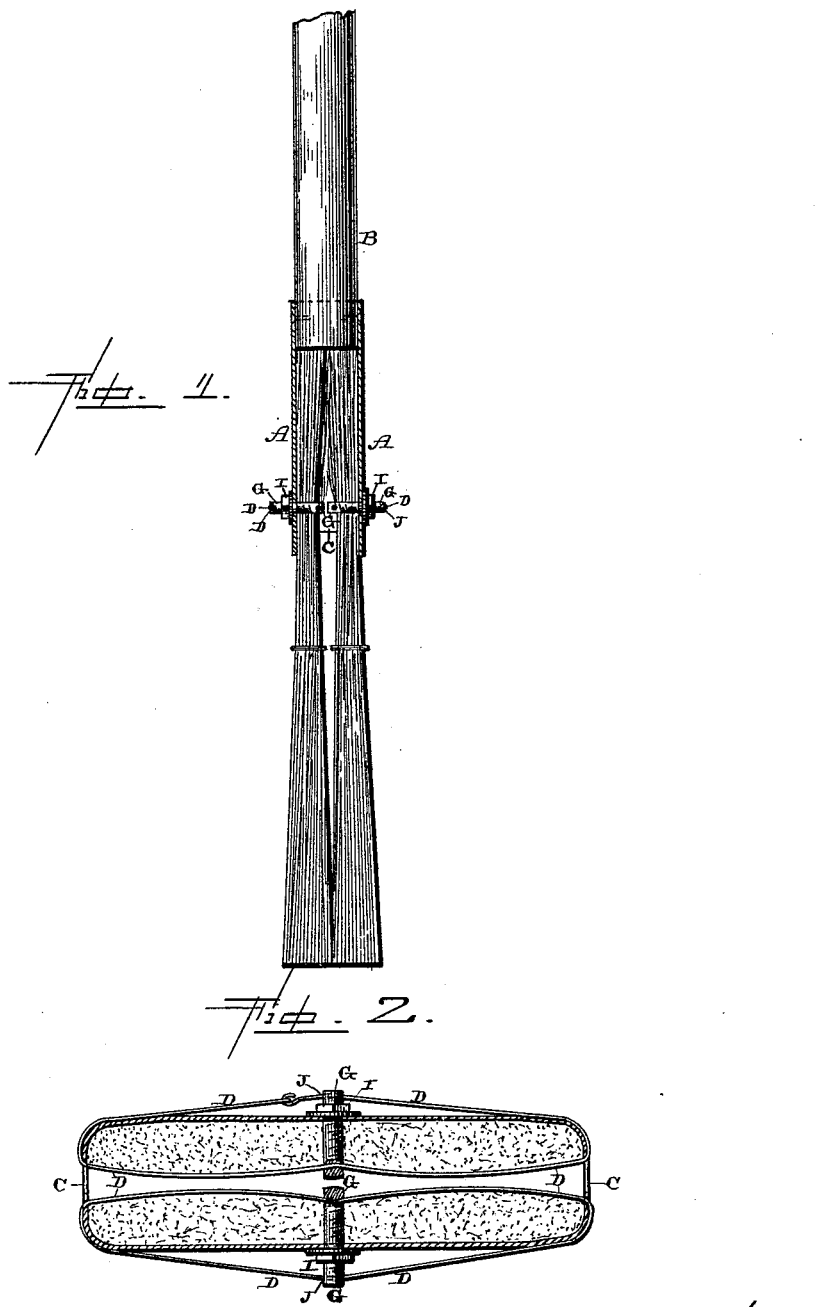

UNITED STATES PATENT OFFICE.

FRANKLIN S. STARK, OF BEULAH, MISSOURI.

BROOM.

SPECIFICATION forming part of Letters Patent No. 394,410, dated December 11, 1888.

Application filed February 28, 1888. Serial No. 265,546. (Model.)

*To all whom it may concern:*

Be it known that I, FRANKLIN S. STARK, of Beulah, in the county of Phelps and State of Missouri, have invented certain new and useful Improvements in Brooms; and I do hereby declare the following to be a full, clear, and exact description of the invention, such as will enable others skilled in the art to which it pertains to make and use it, reference being had to the accompanying drawings, which form part of this specification.

My invention relates to an improvement in brooms; and it consists in the combination of the broom-head, which is rigidly secured to the handle, and which is provided with a slot at each end and a perforation at each side, with the wire which secures the broom-straw in position, threaded bolts provided with eyes at their inner ends and grooves at their outer ends, and a nut for each bolt, as will be more fully described hereinafter.

The object of my invention is to form the broom out of two separate and distinct masses or sections of broom-straw, each of which is secured in the head by means of a wire and tightening-bolt of its own, thus rendering it easier to secure the straw in position than is the case where the broom is made of one mass of broom-straw in the usual manner.

Figure 1 is a vertical section of a broom embodying my invention. Fig. 2 is a horizontal section of the same, taken at right angles to Fig. 1.

A represents the broom-head, which is secured rigidly to the handle B. This head is made of usual form, so as to assist in holding the broom-straw rigidly in position. Through each edge of this head, near its lower corners, are made slots C, through which the wires D pass. Through opposite sides of the head are made suitable openings, through which the threaded eyebolts G pass. These bolts are provided with eyes at their inner ends for the wires D to pass through, so that when the bolts are drawn outward by means of the nuts I, applied to their outer ends, their inner ends, provided with eyes, will draw the wires D toward the sides of the head, and thus clamp the broom-straw rigidly between the wires and the inner sides of the head. The wires D, after having their ends passed through the slots C in the head, have their ends fastened together, as shown, and each wire loop is made to catch in a groove, J, formed in the outer end of the eyebolt. When the nuts are turned so as to force the eyebolts outward, the outer ends of the bolts force the outer portions of the wire loops outward at the same time that the inner ends of the bolts draw the central parts of the loops inward. The bolts being held from turning by the wire loops which pass through their eyes and grooves, the loops are tightened in position, so that there is no possibility of the broom-straw working loose.

The eyebolts serve to separate the two parts of the broom-straw out of which the broom is formed, so that the broom-straw is really divided into four parts, and the wire loops clamp the straw at one place, while their upper ends are clamped tightly in position by the head. Should at any time the straw in either one of the sections out of which the broom is formed become loose, it is only necessary to give the nut upon that side one or two turns, when the wire loop will again be made to clamp the straw rigidly in position. When the straw in either or both sections becomes worn out, it can be readily removed and replaced by new. In this way the head can be made to last indefinitely, and can be supplied with new straw whenever so desired.

Having thus described my invention, I claim—

1. The combination of the handle, the broom-head, and the wire loops which pass through the head, and the two separate and independent sections of the broom-straw out of which the broom is formed, substantially as shown.

2. The combination of the head, the handle, the wire loops, the tightening-bolts, and the two separate and independent sections of broom-straw out of which the broom is formed, substantially as described.

3. The combination of the handle, the broom-head provided with slots in its edges and perforations through its sides, the threaded eyebolts, the wire loops which pass through the slots in the head and eyes in the bolts, and tightening-nuts, substantially as set forth.

In testimony whereof I affix my signature in presence of two witnesses.

FRANKLIN S. STARK.

Witnesses:
K. K. LYNCH,
D. VANDERBILT.